United States Patent [19]

O'Connor

[11] 4,113,836
[45] Sep. 12, 1978

[54] CONTINUOUS GYPSUM CALCINATION PROCESS AND KETTLE THEREFOR

[75] Inventor: Francis J. O'Connor, Rockville Center, N.Y.

[73] Assignee: National Gypsum Company, Dallas, Tex.

[21] Appl. No.: 737,152

[22] Filed: Oct. 29, 1976

[51] Int. Cl.² ............................................ C04B 11/02
[52] U.S. Cl. ...................................... 423/171; 423/172; 432/151; 432/239; 422/109; 422/164; 422/225
[58] Field of Search ................... 23/285, 290; 423/171, 423/172, 555, 151, 239; 106/110; 214/35 R

[56] References Cited

U.S. PATENT DOCUMENTS

| 519,259 | 5/1894 | Higginson | 423/172 |
|---|---|---|---|
| 1,565,249 | 12/1925 | Berry | 23/285 |
| 2,495,147 | 1/1950 | Street | 23/285 |
| 3,131,212 | 4/1964 | Biller | 23/285 |
| 3,236,509 | 2/1966 | Blair | 423/171 |
| 3,285,968 | 11/1966 | Bradley | 23/285 |
| 3,307,915 | 3/1967 | Conroy et al. | 23/277 R |
| 3,378,246 | 4/1968 | Leding | 423/172 |
| 3,508,882 | 4/1970 | Farnell | 23/285 |

FOREIGN PATENT DOCUMENTS

1,558,080 2/1970 Fed. Rep. of Germany .......... 432/151

Primary Examiner—O. R. Vertiz
Assistant Examiner—Wayne A. Langel
Attorney, Agent, or Firm—Robert F. Hause

[57] ABSTRACT

Continuous calcination of gypsum is provided by uniformly feeding uncalcined gypsum into the calcining batch in a kettle to a location below the surface but above the uppermost agitator, and allowing calcined gypsum to be discharged from the kettle through a discharge outlet in the wall of the kettle at the top surface of the calcining gypsum.

9 Claims, 2 Drawing Figures

CONTINUOUS GYPSUM CALCINATION PROCESS AND KETTLE THEREFOR

Numerous gypsum calcining kettles have been constructed, for calcining gypsum batch by batch. Various methods have been proposed for adapting these kettles for continuous calcination, such as those adaptations disclosed in U.S. Pat. Nos. 3,236,509; 3,307,840; 3,307,915 and 3,378,246.

These four prior methods of adapting kettles for continuous calcination all involve feeding gypsum into the air space above the calcining gypsum, within the kettle, to fall freely upon the top surface of the calcining gypsum in the kettle.

The present invention provides a conduit extending to beneath the surface of the calcining gypsum through which the uncalcined gypsum is fed to the calcining gypsum in the kettle.

This conduit extends downward only a small portion of the distance toward the bottom of the kettle, and consequently its installation is very simple, and requires no modification of the standard agitator blades in the kettle.

A calcined gypsum is produced by this novel method and apparatus that has characteristics distinctly different from and superior to other methods of calcination. The finished product is of unusual uniformity, which on addition of water rehydrates almost completely.

It is an object of the present invention to provide an improved method of continuously calcining gypsum in a gypsum calcining kettle.

It is a further object to provide novel apparatus for continuous kettle calcination.

It is a still further object to provide a method of making an improved calcined gypsum.

These and other objects of the invention will be more readily apparent when considered in relation to the preferred embodiment as set forth in the specification and shown in the drawings in which.

Figure 1:
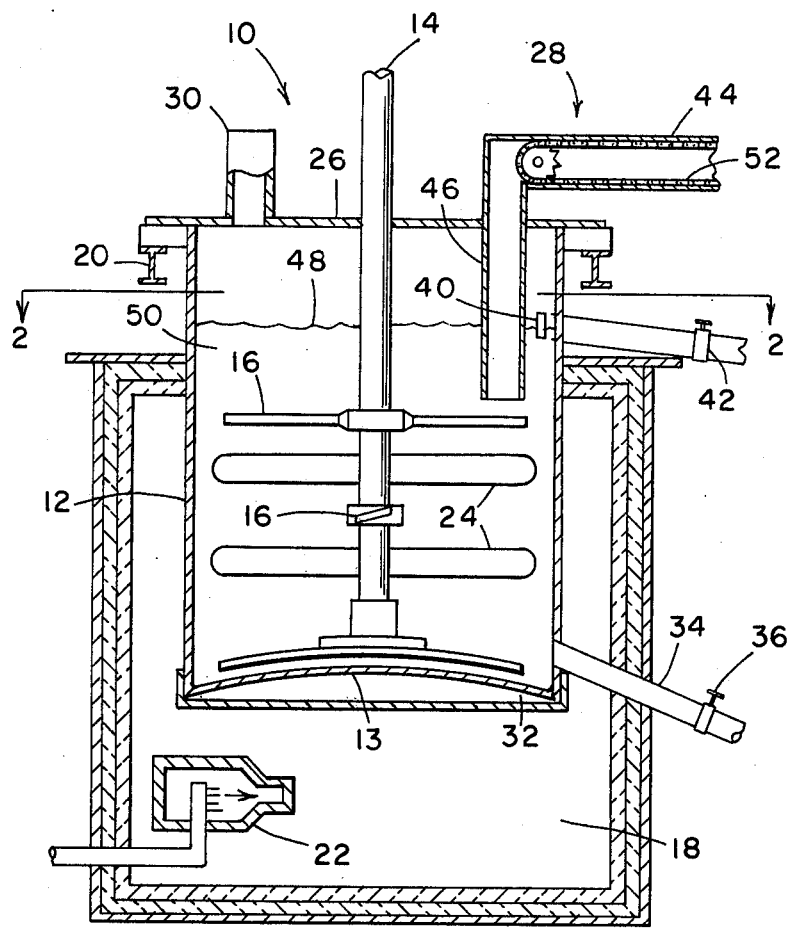
FIG. 1 is a vertical section of a conventional gypsum calcining kettle modified in accordance with the present invention.
Figure 2:
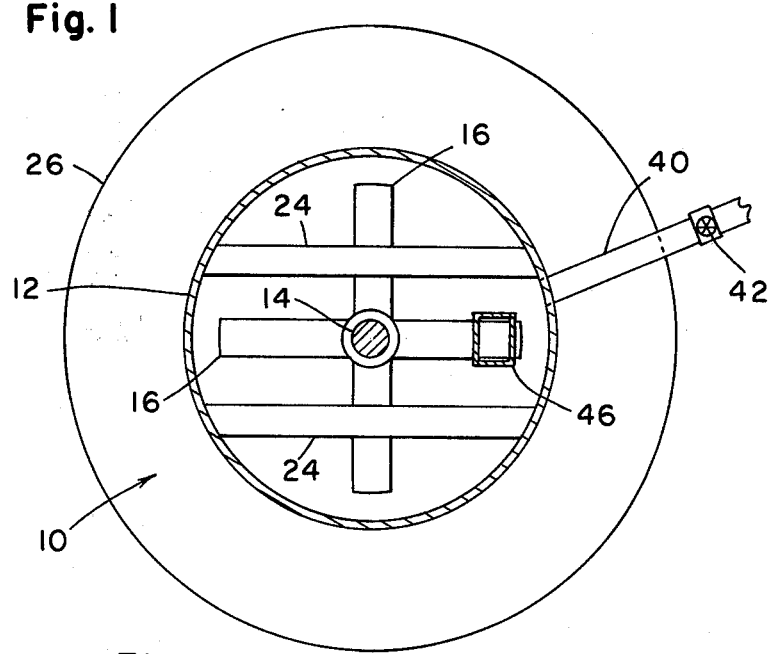
FIG. 2 is a horizontal sectional view of a portion of the kettle of FIG. 1, taken on line 2—2 thereof.

Referring to the drawings, there is shown a hollow cylindrical calcining kettle 10, including cylindrical sidewall 12, convex base 13, centrally located agitator shaft 14, and agitator blades 16 extending from shaft 14. Shaft 14 is suitably mounted for rotation of the blades 16 within the kettle 10.

The kettle 10 is mounted within a combustion chamber 18 by means of two transverse members 20. The combustion chamber is adapted to supply heat from a source of heat 22, in a conventional manner, to the kettle 10. Cross flues 24 extending through the kettle assist in transferring heat to gypsum within the kettle.

The top of the kettle is covered with a top plate 26. A feed inlet 28 extends through top plate 26. A vent 30 is connected to the top plate to release steam to the atmosphere through a suitable dust collector (not shown).

Adjacent the bottom 32 of the kettle, a shutdown outlet 34 is provided through the sidewall 12, with a gate valve 36, for emptying the kettle when operation of the kettle is to be stopped.

Adjacent the top of the kettle, a continuous operation overflow outlet 40 is provided through the sidewall 12, with a manual gate valve 42 which will normally remain open, except during each start-up of operation of the kettle.

The feed inlet 28 includes a horizontal supply duct 44, which has a cross section of about 12 inches (30 cm) square, and a vertical enclosed inserted chute 46, which has a cross section of about 12 inches (30 cm) by 16 inches (40 cm). Inserted chute 46 extends, in accordance with the invention, to below the surface 48 of the calcining gypsum 50, which is disposed within the kettle, during operation of the kettle. Preferably, the inserted enclosed chute 46 extends, as shown, to a depth slightly above the upper agitator blade 16. Thus, the installation of an inserted chute 46, as an added attachment to an existing kettle, will be seen to be an extremely simple modification to make.

The level of the surface 48 of the calcining gypsum 50 will be seen to be substantially aligned with the center of the outlet 40, but will be understood to vary during operation within a range of from the bottom of outlet 40 to the top of outlet 40. Thus the inserted chute 46 must extend to at least below the bottom of outlet 40, in accordance with the invention.

Since it is clear that the distance of the outlet 40 from the top of the kettle will determine the level of surface 48 of the calcining gypsum 50, it will be readily apparent that outlet 40 should be at least in the upper half of the kettle in order to obtain usage of a practical proportion of the depth of the kettle.

Supply duct 44 is shown including a variable speed drag chain 52 which provides a constant feed of uncalcined finely ground gypsum, from a suitable feed bin (not shown), moving through supply duct 44 into inserted chute 46. Other well known means could also be used, in place of chain 52, to move the finely ground gypsum through supply duct 44.

In a typical kettle 10, for containing about 16 tons (14400 kg) of gypsum of 90% finer than 100 mesh (90% will pass through 149 micron openings), having a diameter of about 10 feet (3 meters) and a depth of about 10 feet (3 meters), the inserted chute 46 extends about 2 feet (60 cm) below the bottom of outlet 40, extending along the inner face of sidewall 12. The cross-sectional area of the inserted chute 46 will be seen to be approximately 1% of the total cross-sectional area of the kettle 10.

The continuous operation overflow outlet 40, is shown spaced about two feet away from the inserted chute 46; however, the two can be located at any distance apart around the periphery of the kettle, other than where the inserted chute 46 would block the outlet 40.

The continuous calcination of gypsum process consists of feeding, at a uniform rate, finely ground gypsum, by the drag chain 52, through duct 44 and chute 46, to substantially below the surface 48 of the calcining gypsum 50. Heat is applied to the calcining gypsum from heat source 22.

The temperature of the calcining gypsum, at about 10 inches (25 cm) from the base 13 is maintained at about 310° F (155° C) to 320° F (160° C). During initial operation of a newly modified kettle, in accordance with the invention, the feed rate is varied until a calcining temperature in this range can be maintained. With a suitable feed rate established, the discharge rate through outlet 40 will be such that a constant volume of material remains in the kettle 10. A fine adjustment of the degree of calcination of the gypsum can be maintained by adjusting the amount of heat being applied in accordance with variations in the temperature of the discharging calcined gypsum. This discharge temperature is controlled to be within the range of 290° F (145° C) to 300° F (150° C), in order to produce the best quality of uniformly calcined gypsum. As the discharge temperatures approach the respective limits of this range, suitable controls (not shown) adjust the intensity of the heat source, accordingly. With variations in kettle construction and in raw material purity and composition, this discharge temperature range could vary within the broader range of about 285° F (140° C) to 330° F (165° C).

Normally the feed rate, and thus the discharge rate, are such that about 8 tons (7200 kg) of calcium sulfate hemihydrate are produced per hour, having a very uniform, high quality.

Having completed a detailed disclosure of the preferred embodiment of my invention so that those skilled in the art may practice the same, I contemplate that variations may be made without departing from the essence of the invention or the scope of the appended claims.

I claim:

1. Apparatus for continuously calcining finely ground gypsum comprising a gypsum calcining kettle, means for heating material in said kettle, inlet means for continuously feeding said gypsum to said kettle, and an overflow discharge opening directly from the interior through the sidewall of said kettle in the upper half thereof, said inlet means for continuously feeding said gypsum having an enclosed chute extending downwardly into said kettle and having a lowermost extent nearer the overflow discharge opening than the bottom of said kettle, with the chute having a cross-sectional area of about 1% of the total cross-sectional area of said kettle at the surface of said mass of gypsum and with the chute opening being completely below the bottom of said overflow discharge opening.

2. Apparatus as defined in claim 1 wherein said kettle comprises a sidewall, a base and a top plate, and said enclosed chute extends through said top plate and through the space between said top plate and the horizontal plane which extends through the bottom of said overflow discharge opening.

3. Apparatus as defined in claim 1 wherein said kettle contains a centrally disposed vertical rotary axis with horizontally extending agitator blades which extend to closely adjacent the kettle sidewalls, and said enclosed chute extends downwardly to closely adjacent the uppermost horizontal plane of said agitator blades.

4. Apparatus as defined in claim 1 further comprising means for measuring the temperature of calcined material passing through said overflow discharge opening, and means for controlling the heating means subject to variations in said discharge temperature.

5. Apparatus as defined in claim 4 wherein said inlet means includes means for maintaining a uniform continuous feed of gypsum to said kettle.

6. The process of calcining gypsum which comprises heating a mass of finely ground gypsum in a kettle to a temperature sufficient to convert said gypsum to calcium sulfate hemihydrate, maintaining a substantially continuous supply of gypsum being fed to said kettle, allowing a substantially continuous flow of calcined gypsum at the top of said mass to discharge, through an overflow outlet, from said kettle, whereby a substantially constant depth of calcining gypsum is maintained within said kettle, said supply of gypsum to said kettle being fed through an enclosed chute which extends through the kettle top and down into a zone within said mass of gypsum nearer to the top than the bottom thereof but opening completely below the top surface of said gypsum mass, said chute having a cross-sectional area of about 1% of the total cross-sectional area of said kettle at the surface of said mass of gypsum.

7. The process of claim 1 wherein said mass of calcining gypsum is agitated by at least one blade rotating on a vertical shaft within said kettle, and said enclosed chute extends to closely above the path of said agitator blade.

8. The process of claim 1 wherein the application of heat to said mass is varied inversely in accordance with increases and decreases measured in the temperature of said discharging calcined gypsum.

9. The process of claim 8 wherein said discharging calcined gypsum temperature is maintained within the range of about 290° to 300° F.